(12) United States Patent
Choi et al.

(10) Patent No.: US 12,467,178 B2
(45) Date of Patent: Nov. 11, 2025

(54) WASHING MACHINE AND CONTROL METHOD THEREOF

(71) Applicant: SAMSUNG ELECTRONICS CO., LTD., Suwon-si (KR)

(72) Inventors: Jungchul Choi, Suwon-si (KR); Junhyun Park, Suwon-si (KR); Hooijoong Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 430 days.

(21) Appl. No.: 17/886,000

(22) Filed: Aug. 11, 2022

(65) Prior Publication Data

US 2023/0124378 A1 Apr. 20, 2023

Related U.S. Application Data

(63) Continuation of application No. PCT/KR2022/010191, filed on Jul. 13, 2022.

(30) Foreign Application Priority Data

Oct. 14, 2021 (KR) .......................... 10-2021-0136811

(51) Int. Cl.
*D06F 33/63* (2020.01)
*D06F 25/00* (2006.01)
(Continued)

(52) U.S. Cl.
CPC .............. *D06F 25/00* (2013.01); *D06F 33/63* (2020.02); *D06F 33/70* (2020.02); *D06F 34/26* (2020.02);
(Continued)

(58) Field of Classification Search
CPC .......... D06F 33/63; D06F 33/68; D06F 33/70; D06F 34/18; D06F 34/26; D06F 2103/02;
(Continued)

(56) References Cited

U.S. PATENT DOCUMENTS 7,353,624 B2 4/2008 Chung et al.
10,760,203 B2 9/2020 Seo et al.
(Continued)

FOREIGN PATENT DOCUMENTS

EP 2 112 264 A1 10/2009
EP 4 123 077 A1 1/2023
(Continued)

OTHER PUBLICATIONS

Machine Translation of Han et al., WO-2021187867-A1, Sep. 2021. (Year: 2021).*

(Continued)

*Primary Examiner* — David G Cormier
(74) *Attorney, Agent, or Firm* — STAAS & HALSEY LLP

(57) ABSTRACT

A washing machine according to an aspect of the disclosure includes: a drum; a tub accommodating the drum and storing water; a drum motor configured to provide a rotation force to the drum; a water supplier configured to supply water to the tub; a hot air supplier configured to supply hot air to the drum; a current sensor configured to output a current signal corresponding to a magnitude of current applied to the drum motor; and a controller configured to perform a washing operation while controlling the water supplier and the drum motor, and perform a drying operation while controlling the hot air supplier and the drum motor.

15 Claims, 13 Drawing Sheets

(51) Int. Cl.
  *D06F 33/70*          (2020.01)
  *D06F 34/26*          (2020.01)
  *G05B 19/042*         (2006.01)
  *D06F 103/08*             (2020.01)
  *D06F 103/32*             (2020.01)
  *D06F 103/46*             (2020.01)
  *D06F 105/02*             (2020.01)
  *D06F 105/32*             (2020.01)
  *D06F 105/46*             (2020.01)
  *D06F 105/56*             (2020.01)

(52) U.S. Cl.
  CPC ........ *G05B 19/042* (2013.01); *D06F 2103/08* (2020.02); *D06F 2103/32* (2020.02); *D06F 2103/46* (2020.02); *D06F 2105/02* (2020.02); *D06F 2105/32* (2020.02); *D06F 2105/46* (2020.02); *D06F 2105/56* (2020.02); *G05B 2219/2633* (2013.01)

(58) Field of Classification Search
  CPC ............. D06F 2103/04; D06F 2103/08; D06F 2103/32; D06F 2103/46; D06F 2105/02; D06F 2105/12; D06F 2105/30; D06F 2105/32; D06F 2105/46; D06F 2105/56
  See application file for complete search history.

(56) References Cited

U.S. PATENT DOCUMENTS

| | | |
|---|---|---|
| 10,934,657 B2 | 3/2021 | Kamiyama et al. |
| 2021/0062403 A1 | 3/2021 | Choi et al. |
| 2021/0102328 A1 | 4/2021 | Park |
| 2021/0102329 A1 | 4/2021 | Park |

FOREIGN PATENT DOCUMENTS

| | | | |
|---|---|---|---|
| JP | 2009-171998 | 8/2009 | |
| JP | 4973684 | 7/2012 | |
| JP | 6104571 | 3/2017 | |
| KR | 10-1998-0002347 | 3/1998 | |
| KR | 10-1052778 | 8/2011 | |
| KR | 10-2019-0065149 | 6/2019 | |
| KR | 10-2019-0065150 | 6/2019 | |
| KR | 10-2019-0127415 | 11/2019 | |
| KR | 10-2021-0116333 | 9/2021 | |
| KR | 6941774 | 9/2021 | |
| WO | WO-2021187867 A1 * | 9/2021 | ............. D06F 34/10 |

OTHER PUBLICATIONS

Extended European Search Report issued on Jul. 22, 2024 by the European Patent Office for European Patent Application No. 22881166.7.

International Search Report dated Nov. 8, 2022 in International Patent Application No. PCT/KR2022/010191 (3 pages; 4 pages English translation).

PCT/ISA/237 dated Nov. 8, 2022 in International Patent Application No. PCT/KR2022/010191 (6 pages).

* cited by examiner

[FIG. 1]
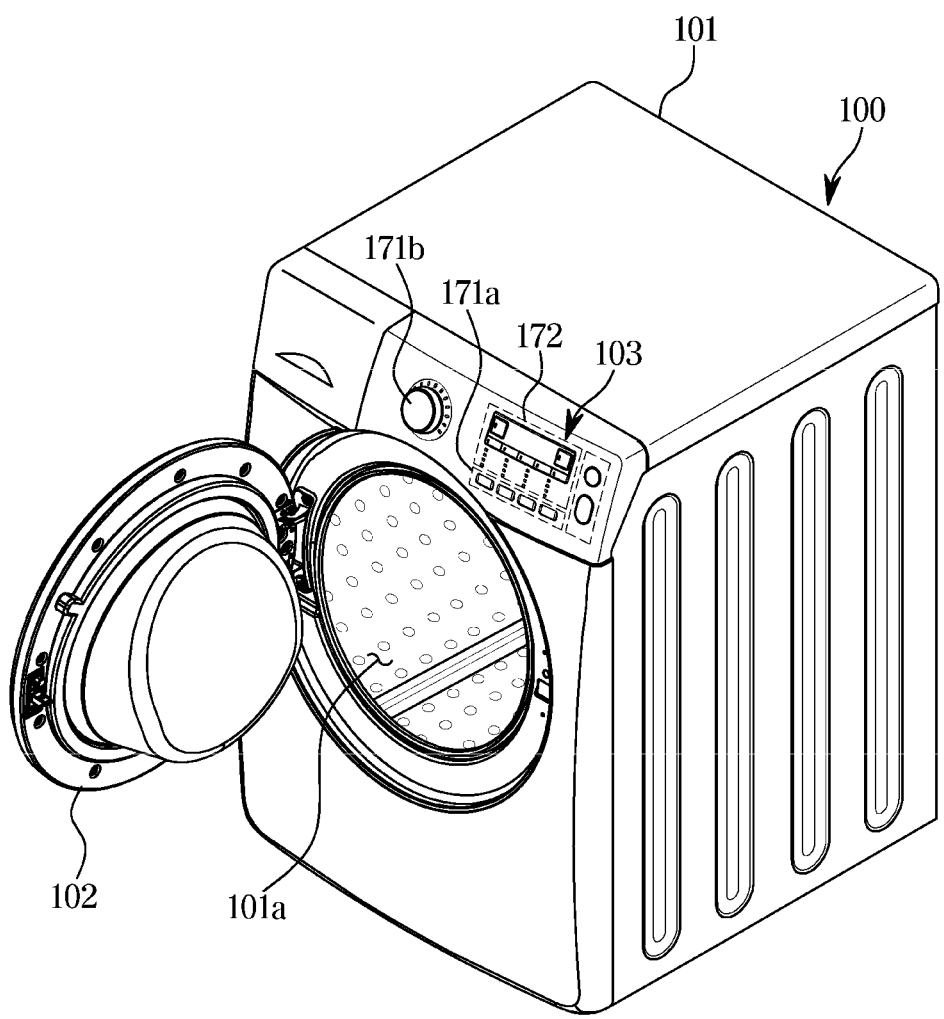

[FIG. 2]
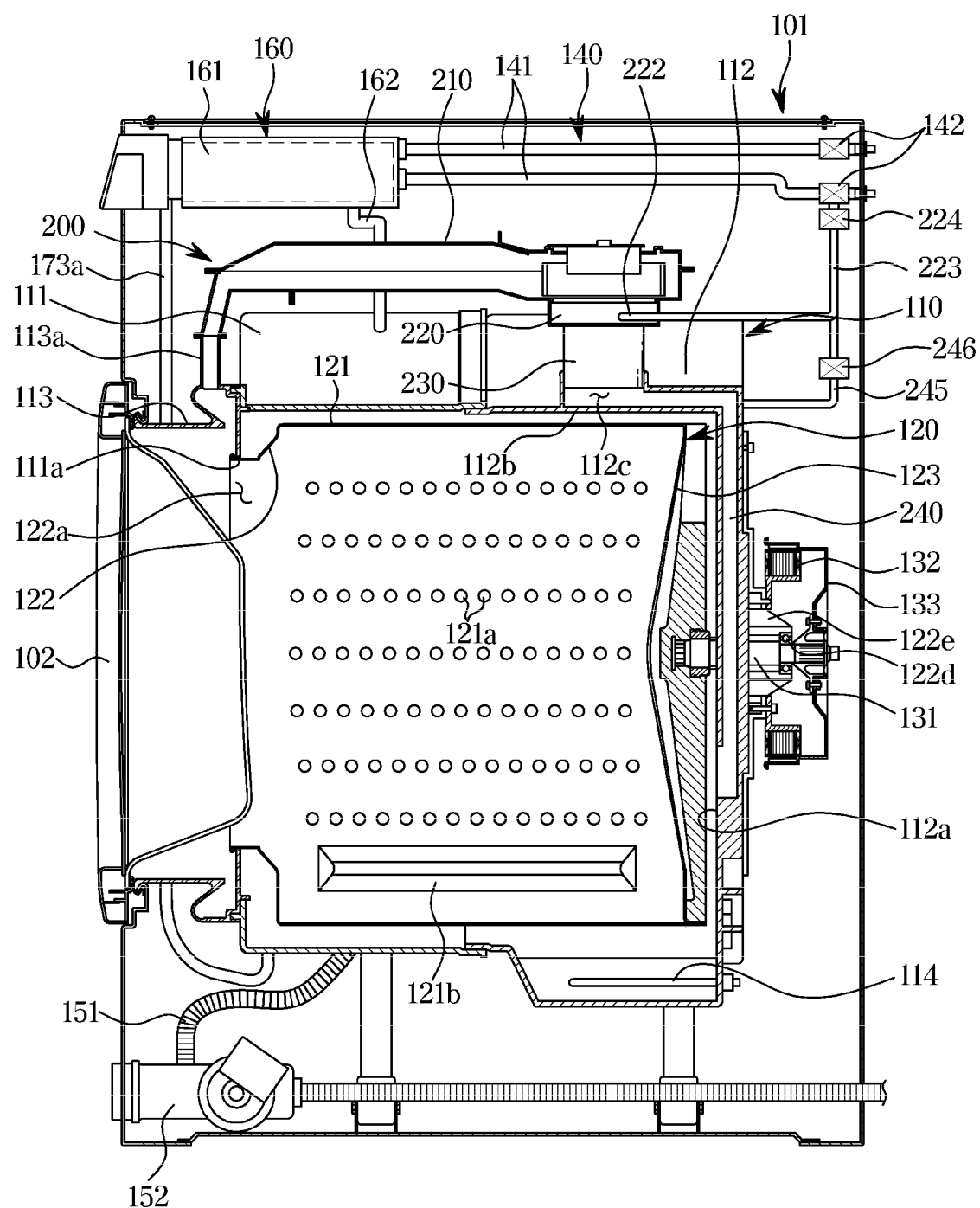

[FIG. 3]
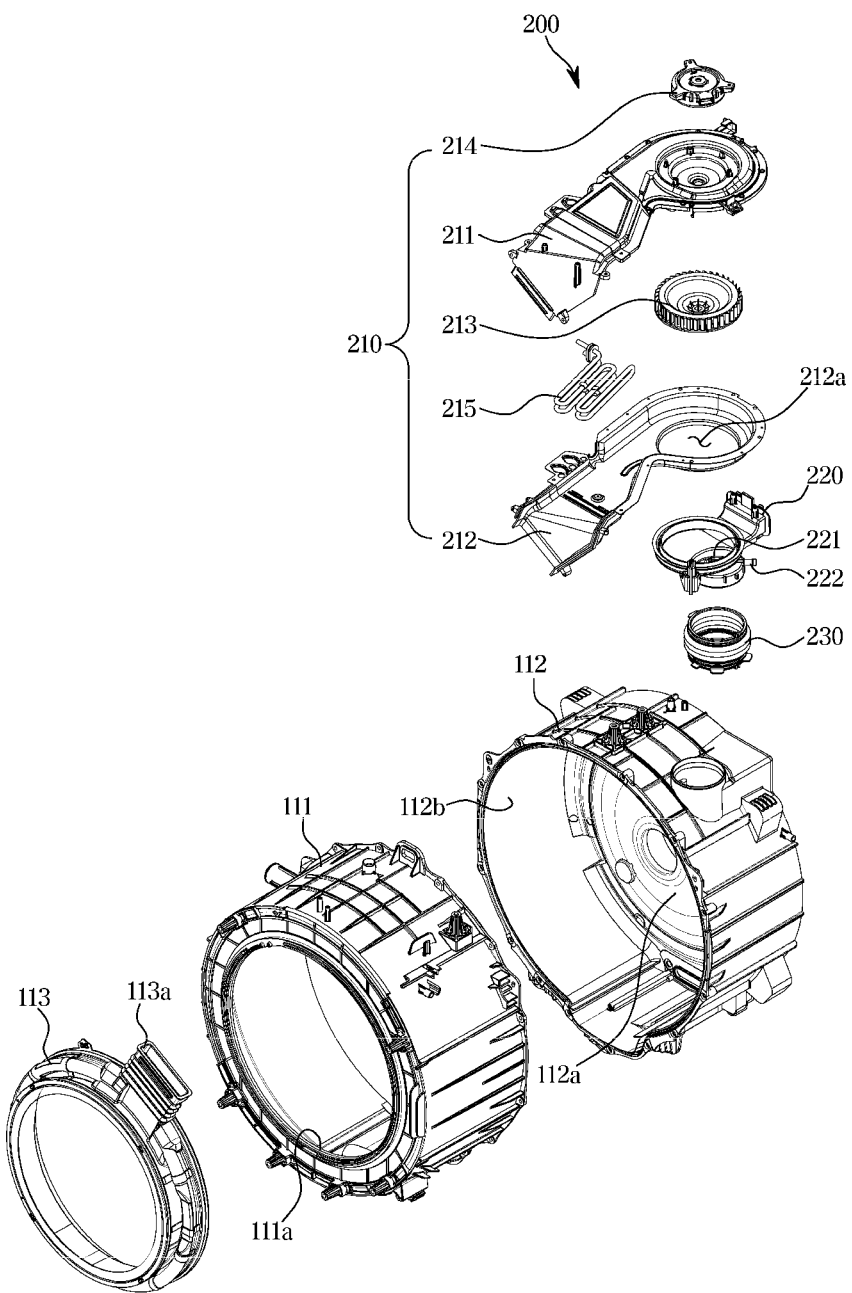

[FIG. 4]
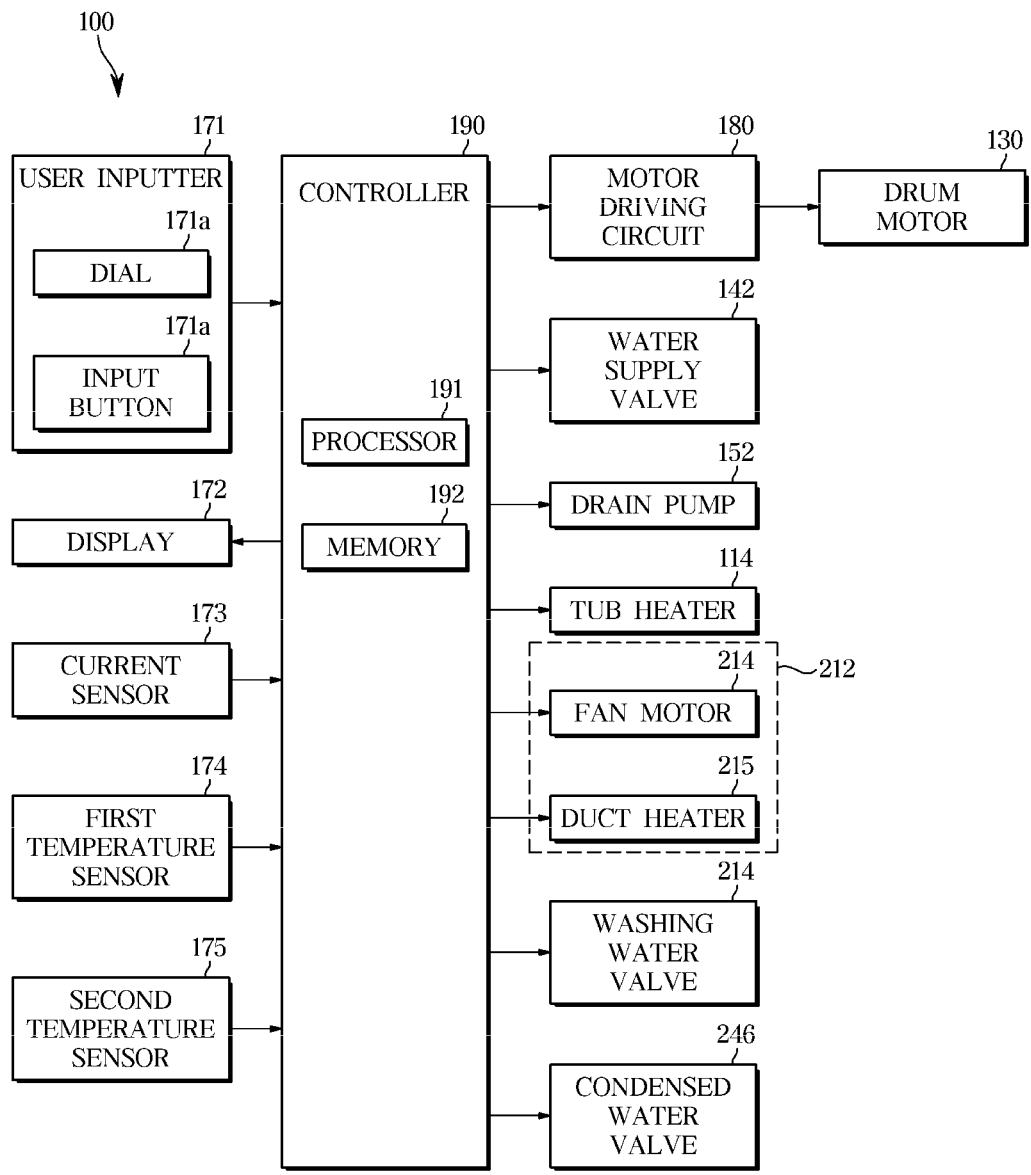

[FIG. 5]
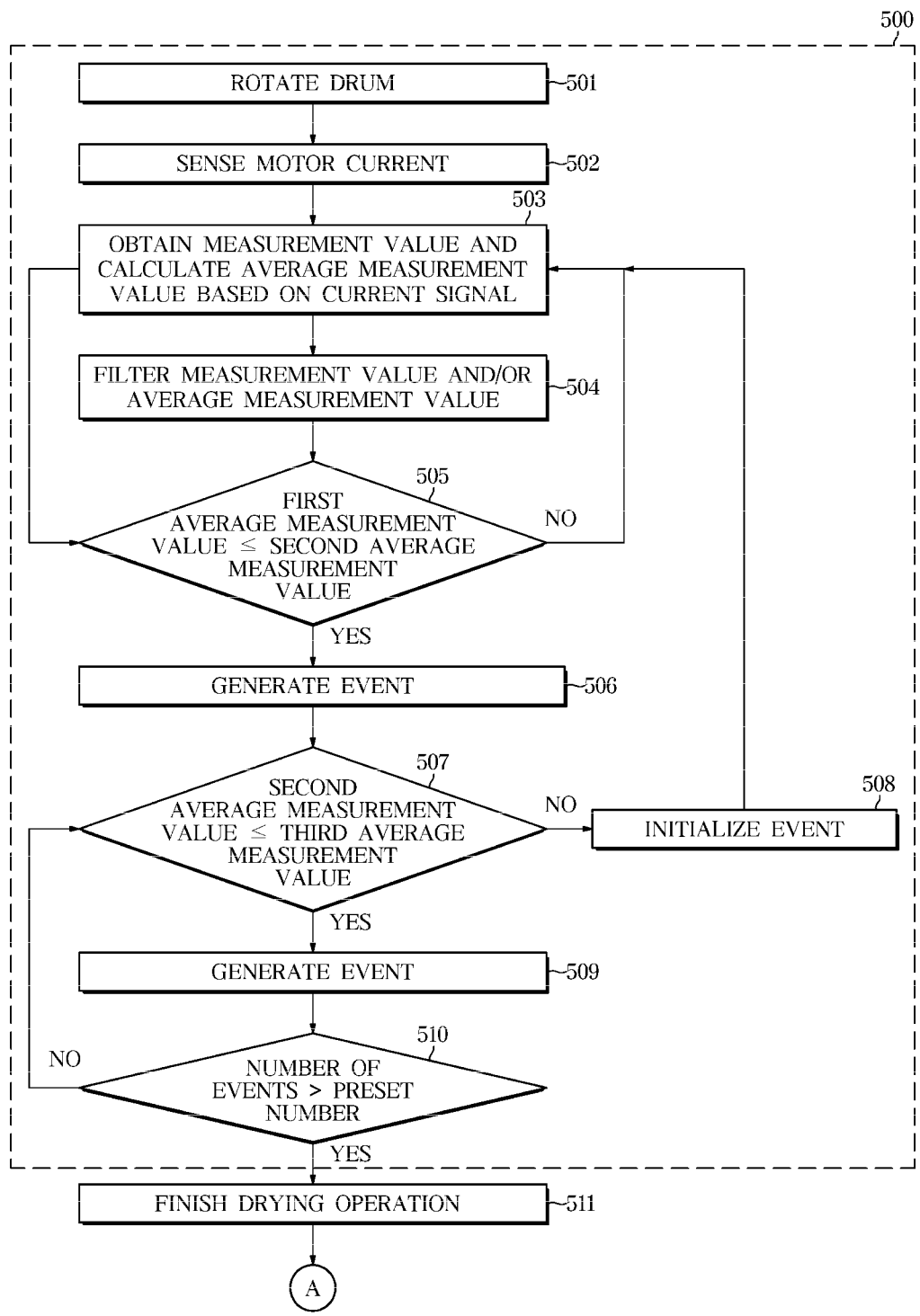

[FIG. 6]
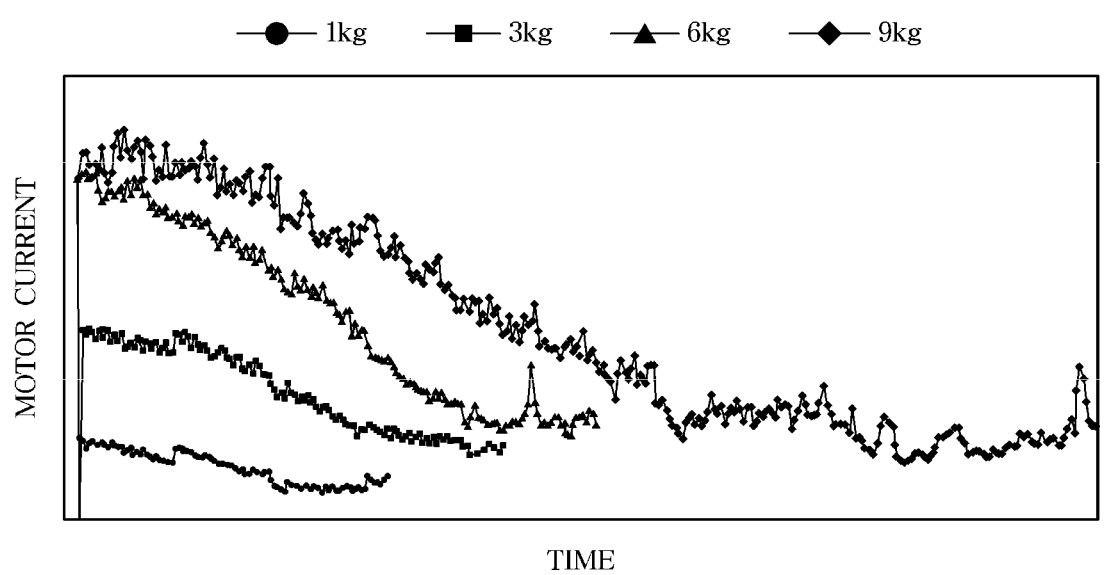

[FIG. 7]
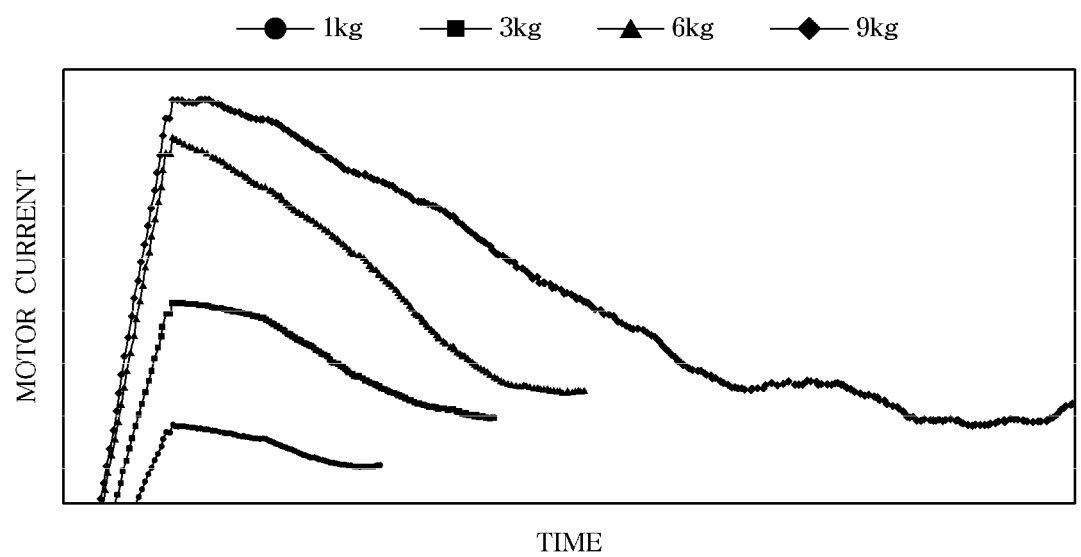

[FIG. 8]
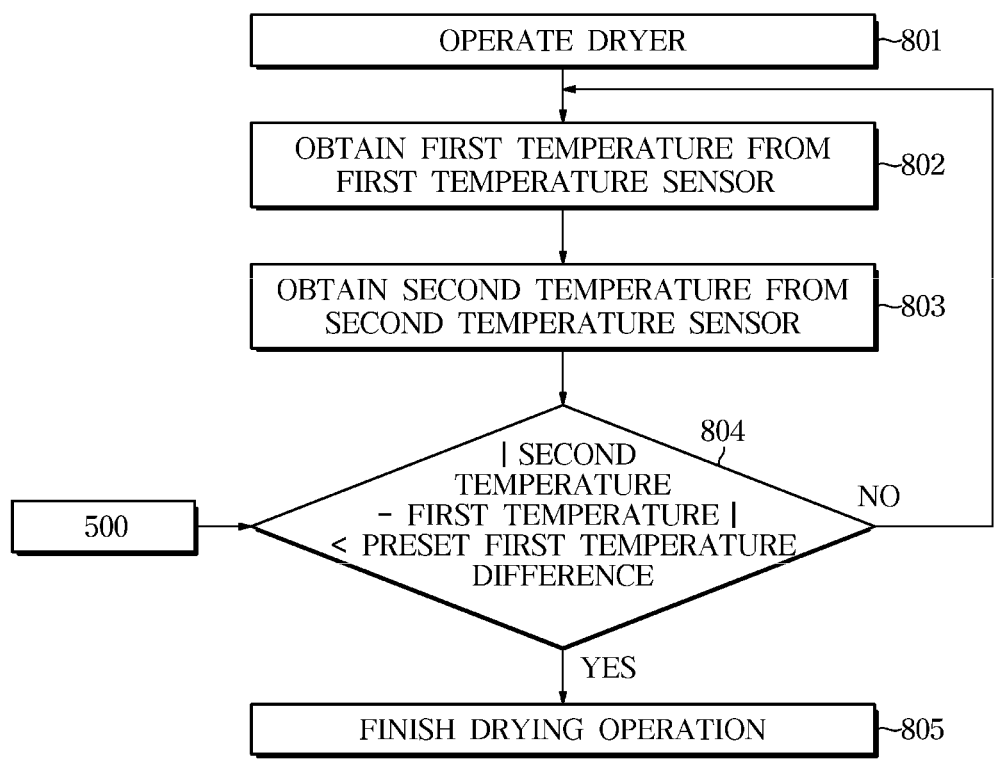

[FIG. 9]
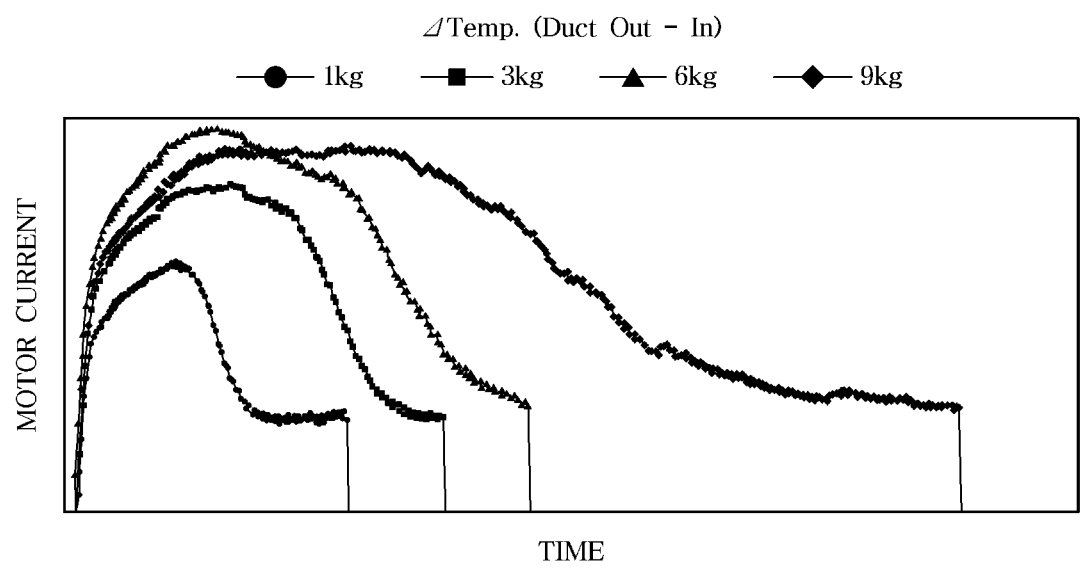

[FIG. 10]
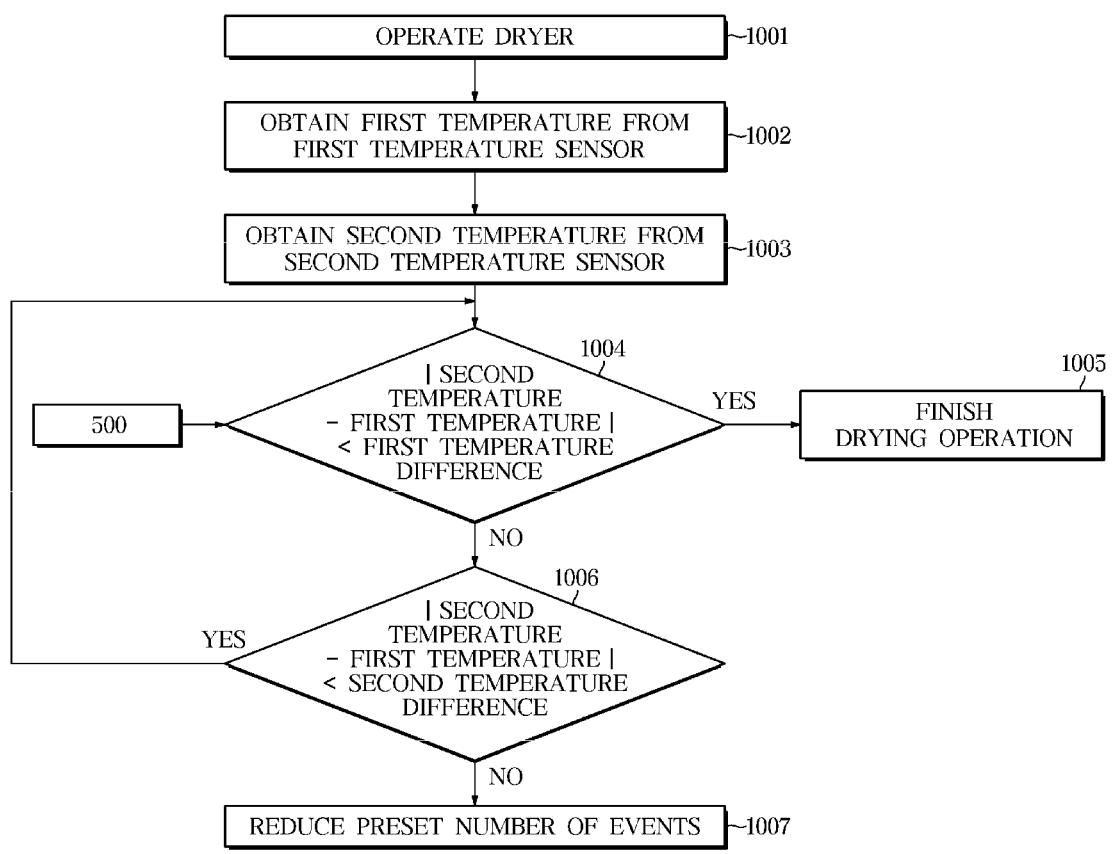

[FIG. 11]
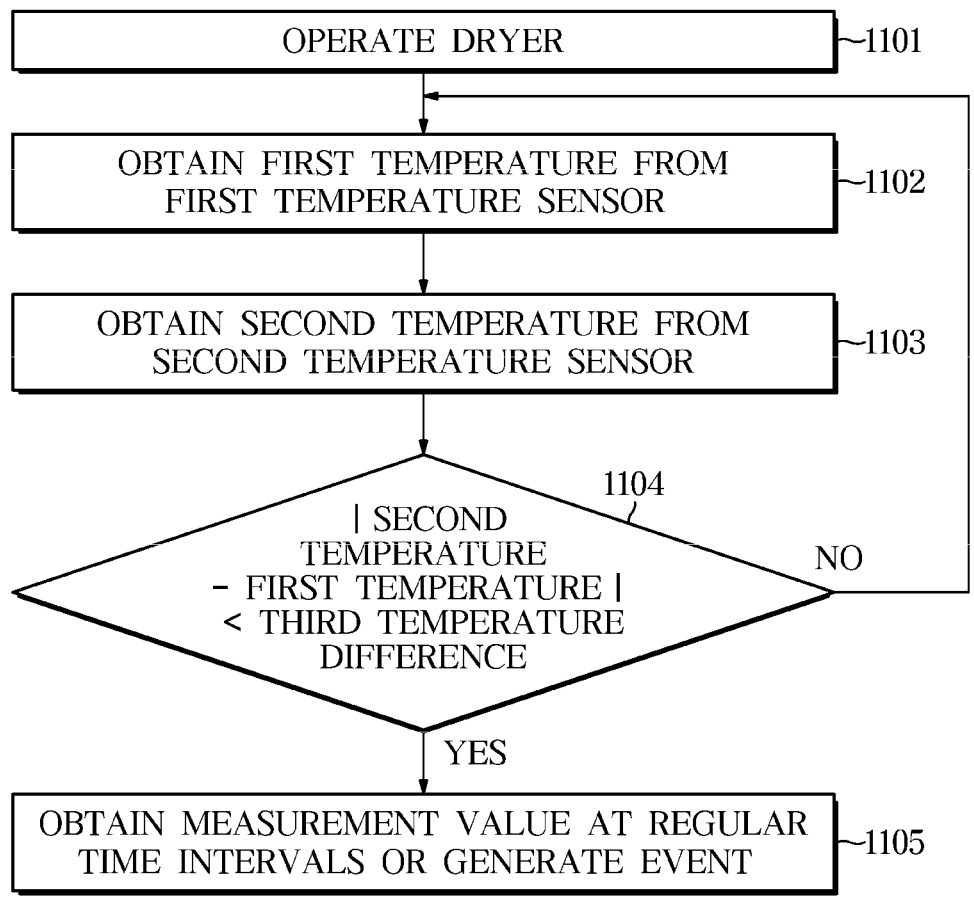

[FIG. 12]
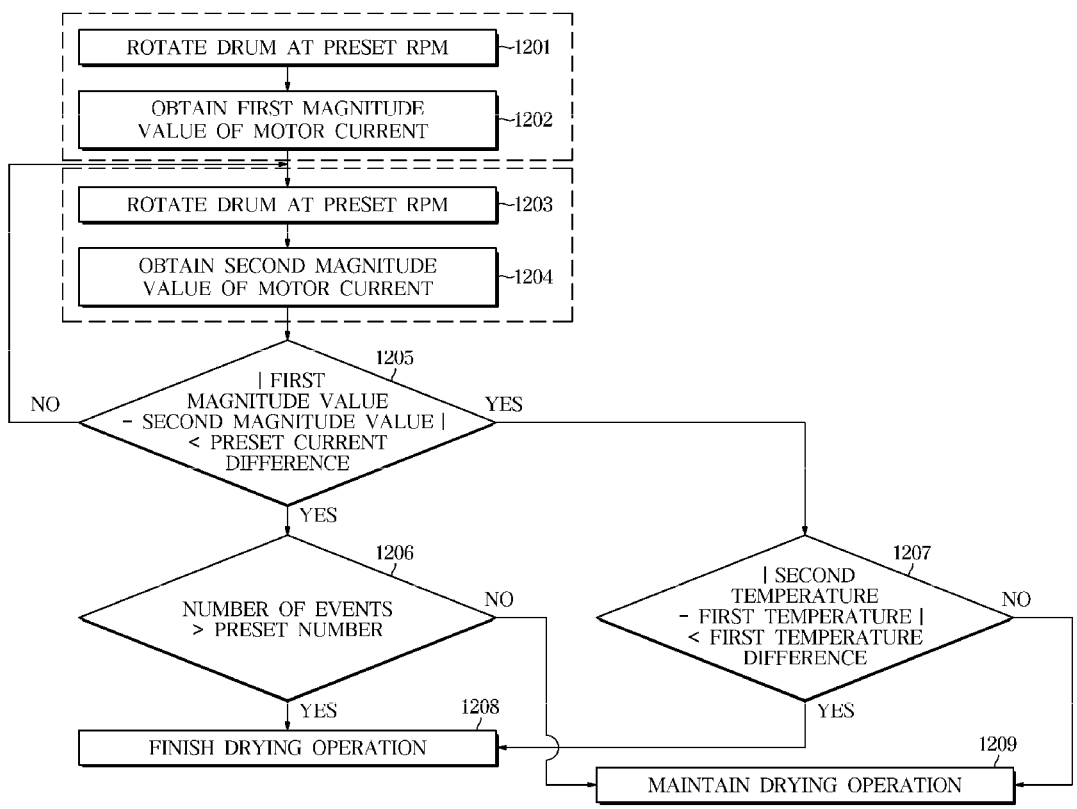

[FIG. 13]
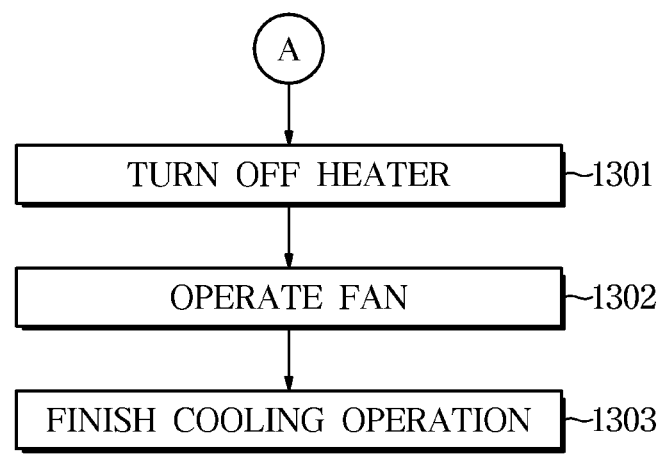

WASHING MACHINE AND CONTROL METHOD THEREOF

CROSS-REFERENCE TO RELATED APPLICATION

This application is based on and claims priority under 35 U.S.C. § 111(a), of international application No. PCT/KR2022/010191, filed on Jul. 13, 2022, which claims priority to Korean Patent Application No. 10-2021-0136811, filed on Oct. 14, 2021 in the Korean Intellectual Property Office, the disclosure of which is incorporated by reference herein in its entirety.

BACKGROUND

1. Field

The disclosure relates to a washing machine capable of washing and drying laundry, such as clothes, etc., and a control method thereof.

2. Description of the Related Art

A washing machine is a machine for washing clothes, and generally, the washing machine includes a tub for storing water and a drum for generating mechanical energy inside the tub to separate dirt from laundry.

There is a washing machine having a drying function. The washing machine includes a dryer for drying laundry by blowing hot air generated by a drying heater into an accommodating space where the laundry is accommodated, and the washing machine can perform a dehydrating function and a drying function in connection with a washing function.

The washing machine includes a sensor (for example, a humidity sensor) inside the drum, and uses a method of determining a dried state of laundry through the sensor directly contacting the laundry.

However, the method may generate an error in determining a dried state of laundry according to an installation location of the sensor and irregular movements of the laundry, which leads to incomplete drying of the laundry or a waste of energy due to excessive drying.

SUMMARY

Additional aspects of the disclosure will be set forth in part in the description which follows and, in part, will be obvious from the description, or may be learned by practice of the disclosure.

In accordance with an aspect of the disclosure, a washing machine includes: a drum to receive an object, the drum being rotatable; a tub to accommodate the drum and to receive water; a drum motor configured to provide a rotation force to the drum, for the drum to rotate within the tub; a water supplier configured to supply the water to the tub; a hot air supplier configured to supply hot air to the drum; a current sensor configured to output a current signal based on a magnitude of current applied to the drum motor to rotate the drum; and a controller configured to perform a washing operation while controlling the water supplier and the drum motor, and a drying operation while controlling the hot air supplier and the drum motor, wherein the controller is configured determine a dryness of the object, accommodated in the drum, based on the current signal received while performing the drying operation, obtain an average measurement value corresponding to the dryness of the object by calculating an average of a plurality of measurement values measured during a preset time period, compare a first average measurement value with a second average measurement value obtained in succession to the first average measurement value, determine an event is generated based on a determination that the second average measurement value is greater than or equal to the first average measurement value, and control the hot air supplier based on the number of times by which the event is generated.

The controller may be further configured to control the hot air supplier based on a determination that the event is sequentially generated.

The controller may be further configured to control the hot air supplier based on a determination that a preset number of events have been sequentially generated, and erase the number of previously generated events according to a determination that the second average measurement value is smaller than the first average measurement value.

The washing machine may further include a first temperature sensor configured to measure temperature of air discharged from the drum and a second temperature sensor configured to measure temperature of air supplied from the hot air supplier to the drum, wherein the controller may be further configured to control the hot air supplier based on a difference between first temperature measured by the first temperature sensor and second temperature measured by the second temperature sensor, upon generation of the event.

The controller may be further configured to compare the difference between the first temperature and the second temperature with a preset reference value.

The controller may be further configured to determine an execution time of the washing operation based on the current signal.

The controller may be further configured to determine an amount of water to be supplied to the tub based on the current signal, and control the water supplier according to the amount of water.

The controller may be further configured to rotate the drum at preset revolutions per minute (rpm) before starting the washing operation to obtain a first magnitude value of motor current applied to the drum motor at the preset rpm, rotate the drum at the preset rpm during the drying operation to obtain a second magnitude value of motor current applied to the drum motor at the preset rpm, and finish the drying operation according to a determination that a difference between the first magnitude value and the second magnitude value is smaller than or equal to a preset current difference and the number of sequentially generated events reaches a preset number.

The controller may be further configured to rotate the drum at preset revolutions per minute (rpm) before starting the washing operation to obtain a first magnitude value of motor current applied to the drum motor at the preset rpm, rotate the drum at the preset rpm during the drying operation to obtain a second magnitude value of motor current applied to the drum motor at the preset rpm, and finish the drying operation according to a determination that a difference between the first magnitude value and the second magnitude value is smaller than or equal to a preset current difference and a difference between temperature measured by the first temperature sensor and temperature measured by the second temperature sensor is smaller than or equal to a first temperature difference.

The controller may be further configured to turn off a heater and turn on a fan to perform a cooling operation after finishing the drying operation.

In accordance with an aspect of the disclosure, a method for controlling a washing machine with a drying function, the washing machine including a drum to receive an object, the drum being rotatable, a tub to accommodate the drum and to receive water, a drum motor configured to provide a rotation force to the drum, for the drum to rotate within the tub, a water supplier configured to supply the water to the tub, a hot air supplier configured to supply hot air to the drum, and a current sensor configured to output a current signal based on a magnitude of current applied to the drum motor to rotate the drum, the method includes: determining a dryness of the object, accommodated in the drum, based on the current signal received while performing the drying operation; obtaining an average measurement value corresponding to the dryness of the object by calculating an average of a plurality of measurement values measured during a preset time period; comparing a first average measurement value with a second average measurement value obtained in succession to the first average measurement value; determining an event is generated based on a determination that the second average measurement value is greater than or equal to the first average measurement value; and controlling the hot air supplier based on the number of times by which the event is generated.

The controlling of the hot air supplier may include controlling the hot air supplier according to a determination that the event is sequentially generated.

The method may further include controlling the hot air supplier based on a determination that a preset number of events have been sequentially generated, and erasing the number of previously generated events according to a determination that the second average measurement value is smaller than the first average measurement value.

The washing machine may further include a first temperature sensor configured to measure temperature of air discharged from the drum and a second temperature sensor configured to measure temperature of air supplied from the hot air supplier to the drum, and the controlling of the hot air supplier may include controlling the hot air supplier based on a difference between first temperature measured by the first temperature sensor and second temperature measured by the second temperature sensor, upon generation of the event.

The controlling of the hot air supplier may further include comparing the difference between the first temperature and the second temperature with a preset reference value.

The method may further include determining an execution time of the washing operation based on the current signal.

The method may further include determining an amount of water to be supplied to the tub based on the current signal, and controlling the water supplier according to the amount of water.

The method may further include: rotating the drum at preset revolutions per minute (rpm) before starting the washing operation to obtain a first magnitude value of motor current applied to the drum motor at the preset rpm, rotating the drum at the preset rpm during the drying operation to obtain a second magnitude value of motor current applied to the drum motor at the preset rpm, and finishing the drying operation according to a determination that a difference between the first magnitude value and the second magnitude value is smaller than or equal to a preset current difference and the number of sequentially generated events reaches a preset number.

The method may further include: rotating the drum at preset revolutions per minute (rpm) before starting the washing operation to obtain a first magnitude value of motor current applied to the drum motor at the preset rpm, rotating the drum at the preset rpm during the drying operation to obtain a second magnitude value of motor current applied to the drum motor at the preset rpm, and finishing the drying operation according to a determination that a difference between the first magnitude value and the second magnitude value is smaller than or equal to a preset current difference and a difference between temperature measured by the first temperature sensor and temperature measured by the second temperature sensor is smaller than or equal to a first temperature difference.

The method may further include turning off a heater and turning on a fan to perform a cooling operation after finishing the drying operation.

BRIEF DESCRIPTION OF THE DRAWINGS

The above and other aspects, features, and advantages of certain embodiments of the present disclosure will become apparent from the following description taken in conjunction with the accompanying drawings of which:

FIG. 1 shows an outer appearance of a washing machine according to an embodiment of the disclosure.

FIG. 2 is a side cross-sectional view of a washing machine according to an embodiment of the disclosure.

FIG. 3 is an exploded view of a dryer included in a washing machine according to an embodiment of the disclosure.

FIG. 4 is a control block diagram of a washing machine according to an embodiment of the disclosure.

FIG. 5 is a flowchart illustrating a method for controlling a washing machine according to an embodiment of the disclosure.

FIG. 6 is a graph showing a reduction of motor current over drying time of laundry.

FIG. 7 shows data obtained by applying filtering to the graph of FIG. 6.

FIG. 8 is a flowchart illustrating a method for controlling a washing machine including a dryer according to an embodiment of the disclosure.

FIG. 9 shows differences between inlet temperature and outlet temperature of the dryer according to an embodiment of the disclosure shown in FIG. 8.

FIG. 10 is a flowchart illustrating a method for controlling a washing machine according to an embodiment of the disclosure to reduce a number of events.

FIG. 11 is a flowchart illustrating a method for controlling a washing machine according to an embodiment of the disclosure to determine an event generation time.

FIG. 12 is a flowchart illustrating a method for controlling a washing machine according to an embodiment of the disclosure to determine a completion time of a dry operation based on an initial load.

FIG. 13 is a flowchart illustrating a cooling operation of a washing machine according to an embodiment of the disclosure.

DETAILED DESCRIPTION

Like reference numerals will refer to like components throughout this specification. This specification does not describe all components of the embodiments, and general information in the technical field to which the present disclosure belongs or overlapping information between the embodiments will not be described. As used herein, the terms "portion", "part, "module, "member" or "block" may be implemented as software or hardware, and according to embodiments, a plurality of "portions", "parts, "modules, "members" or "blocks" may be implemented as a single component, or a single "portion", "part, "module, "member" or "block" may include a plurality of components.

It will be understood that when a certain part is referred to as being "connected" to another part, it can be directly or indirectly connected to the other part. When a part is indirectly connected to another part, it may be connected to the other part through a wireless communication network.

Also, it will be understood that when the terms "includes," "comprises," "including," and/or "comprising," when used in this specification, specify the presence of a stated component, but do not preclude the presence or addition of one or more other components.

In the entire specification, it will also be understood that when an element is referred to as being "on" or "over" another element, it can be directly on the other element or intervening elements may also be present.

Also, it will be understood that, although the terms "first", "second", etc., may be used herein to describe various components, these components should not be limited by these terms. The above terms are used only to distinguish one component from another.

Also, it is to be understood that the singular forms "a," "an," and "the" include plural referents unless the context clearly dictates otherwise.

Reference numerals used in operations are provided for convenience of description, without describing the order of the operations, and the operations can be executed in a different order from the stated order unless a specific order is definitely specified in the context.

Throughout the disclosure, the expression "at least one of a, b or c" indicates only a, only b, only c, both a and b, both a and c, both b and c, all of a, b, and c, or variations thereof.

Therefore, it is an aspect of the disclosure to provide a washing machine capable of accurately determining a dried state of laundry through a non-contact sensor, and a method for controlling the washing machine.

Hereinafter, embodiments of the disclosure will be described with reference to the accompanying drawings.

FIG. 1 shows an outer appearance of a washing machine according to an embodiment of the disclosure. FIG. 2 is a side cross-sectional view of a washing machine according to an embodiment of the disclosure. FIG. 3 is an exploded view of a tub and a dryer included in a washing machine according to an embodiment of the disclosure.

Referring to FIGS. 1, 2, and 3, a washing machine 100 may include: a cabinet 101, a tub 110, a drum 120, a drum motor 130, a water supplier 140, a water drain 150, a detergent supplier 160, and a dryer 200.

The washing machine 100 according to an embodiment of the disclosure may be an apparatus capable of performing a dry operation. The washing machine 100 may dry laundry by supplying hot air into the drum 120, unlike an existing washing machine that performs only a washing operation and a dehydrating operation. The washing machine 100 may be a washing machine with a drying function, and configurations and operations which will be described below may also be applied to a drying apparatus for performing only a drying operation.

The cabinet 101 may accommodate configurations included in the washing machine 100. For example, the cabinet 101 may accommodate the tub 110, the drum 120, the drum motor 130, the water supplier 140, the water drain 150, the detergent supplier 160, and the dryer 200.

In a front center of the cabinet 101, an entrance 101a through which a user puts laundry or takes laundry out may be formed.

In the entrance 101a, a door 102 for opening and closing the entrance 101a may be provided. The door 102 may be rotatably installed on the cabinet 101 by a hinge. In a closed state of the entrance 101a, the door 102 may be locked by a locking device.

In a front upper portion of the cabinet 101, a control panel 103 including a user inputter for obtaining a user input for the washing machine 100 from the user and a display displaying operation information of the washing machine 100 may be provided.

The tub 110 may be provided inside the cabinet 101, and accommodate water for washing and/or rinsing.

The tub 110 may include a tub front part 111 having a front side in which an opening 111a is formed, and a tub rear part 112 being in a shape of a cylinder of which a rear side is closed.

In the front side of the tub front part 111, the opening 111a may be provided to enable a user to put laundry into the drum 120 provided inside the tub 110 or take laundry out of the drum 120.

In the opening 111a of the tub front part 111, a diaphragm 113 may be provided, and the diaphragm 113 may connect the opening 111a to the entrance 101a of the cabinet 101. In an upper portion of the diaphragm 113, a discharge port 113a may be provided to discharge air heated and dried by the dryer 200 into the tub 110 or the drum 120 during a drying operation.

A lower portion of the tub front part 111 may be connected to a drain pipe 151 extending to a drain pump 152.

In a rear wall 112a of the tub rear part 112, a bearing housing 112e and a bearing 112d for rotatably fixing the drum motor 130 may be provided.

In a lower portion of the tub rear part 112, a tub heater 114 may be provided. The tub heater 114 may heat water accommodated in the tub 110. The tub heater 114 may operate to raise temperature of water accommodated in the tub 110 up to temperature set by a user.

In an upper portion of the tub rear part 112, an inlet port 112c for sucking inside air of the tub 110 or the drum 120 into the dryer 200 during a drying operation may be provided. In a side wall 112b of the tub rear part 112, a condensing duct 240 for guiding inside air of the tub 110 or the drum 120 to the inlet port 112c during a drying operation may be formed.

The condensing duct 240 will be described in more detail below.

The drum 120 may be rotatably provided inside the tub 110, and accommodate laundry.

The drum 120 may include a drum body 121 being in a shape of a cylinder, a drum front part 122 provided in a front side of the drum body 121, and a drum rear part 123 provided in a rear side of the drum body 121.

In an inner surface of the drum body 121, a through hole 121a connecting inside of the drum 120 to inside of the tub 110, and a lifter 121b for raising laundry upward while the drum 120 rotates may be provided. In the drum front part 122, an opening 122a for enabling a user to put laundry into the drum 120 or take laundry out of the drum 120 may be provided. The drum rear part 123 may be connected to a shaft 131 of the drum motor 130 for rotating the drum 120.

The drum motor 120 may be provided on an outer side of the rear wall 112a of the tub 110, and connected to the drum 120 through the shaft 131. The shaft 131 may penetrate the rear wall 112a of the tub 110, and the shaft 131 may also be rotatably supported by the bearing 112*d* and the bearing housing 112*e* provided on the rear wall 112*a* of the tub 110.

The drum motor 130 may include a stator 132 fixed on the outer side of the rear wall 112*a* of the tub rear part 112, and a rotor 133 being rotatable and connected to the shaft 131. The rotor 133 may rotate through a magnetic interaction with the stator 132, and a rotation of the rotor 133 may be transferred to the drum 120 through the shaft 131.

The drum motor 130 may include, for example, a Brush-Less Direct Current (BLDC) motor capable of easily controlling revolutions per minute (rpm) or a Permanent Magnet Synchronous Motor (PMSM).

The water supplier 140 may be provided above the tub 110, and supply water to the tub 110 or the drum 120.

The water supplier 140 may include a water supply pipe 141 connected to an external water supply source to supply water to the tub 110, and a water supply valve 142 provided on the water supply pipe 141.

The water supply pipe 141 may extend from the external water supply source to a detergent case 161, and guide water to the tub 110 via the detergent case 161.

The water supply valve 142 may supply water from the external water supply source to the tub 110 or block water from being supplied from the external water supply source to the tub 110, in response to an electrical signal. The water supply valve 142 may include, for example, a solenoid valve that is opened or closed in response to an electrical signal.

The water drain 150 may be provided below the tub 110, and discharge water accommodated in the tub 110 or the drum 120 to outside.

The water drain 150 may include the drain pipe 151 extending from the tub 110 to the outside of the cabinet 101, and the drain pump 152 provided on the drain pipe 151. The drain pump 152 may pump water of the drain pipe 151 to the outside of the cabinet 101.

The detergent supplier 160 may be provided above the tub 110, and supply a detergent to the tub 110 or the drum 120.

The detergent supplier 160 may include the detergent case 161 storing a detergent, and a mixing pipe 162 connecting the detergent case 161 to the tub 110.

The detergent case 161 may be connected to the water supply pipe 141, and water supplied through the water supply pipe 141 may be mixed with the detergent stored in the detergent case 161. A mixture of the detergent and water may be supplied to the tub 110 via the mixing pipe 162.

The dryer 200 may be provided on the tub 110 and the rear wall 112*a* of the tub 110 to dry laundry accommodated in the drum 120.

The dryer 200 may include a heating duct 210, a filter housing 220, a connecting pipe 230, and the condensing duct 240.

The heating duct 210 may be provided on the tub 110, and air sucked from the tub 110 may be heated by passing through the heating duct 210.

The heating duct 210 may extend from a rear side of the tub 110 to a front side of the tub 110. A front side of the heating duct 210 may be connected to the discharge port 113*a*, and a rear side of the heating duct 210 may be connected to the filter housing 220.

The heating duct 210 may be in a shape of a tube extending from the rear side of the tub 110 to the front side of the tub 110, and include a duct upper plate 211 and a duct lower plate 212. However, the shape of the heating duct 210 is not limited to that shown in FIG. 3.

A fan 213, a fan motor 214, and a duct heater 215 may be provided inside the heating duct 210, that is, between the duct upper plate 211 and the duct lower plate 212.

The fan motor 214 may be connected to the fan 213 through a rotation shaft, and provide a rotation force to the fan 213.

The fan 213 may be positioned in an opening 212*a* of the duct lower plate 212, and the fan 213 may rotate to cause air to circulate between the tub 110 and the heating duct 210. For example, the fan 213 may suck inside air of the tub 110 or the drum 120 from the rear side of the tub 110 to the heating duct 210, and discharge air of the heating duct 210 to the front side of the tub 110.

The duct heater 215 may heat air passing through the heating duct 210. Air of the tub 110 may be sucked into the heating duct 210 by the fan 213, and flow inside the heating duct 210. The duct heater 215 may heat air flowing along the heating duct 210. The heated air may be discharged to the tub 110 by the fan 213.

The filter housing 220 may be provided between the heating duct 210 and the tub 110, and guide air sucked from the tub 110 through the connecting pipe 230 to the heating duct 210.

The filter housing 220 may be connected to the heating duct 210. Also, the filter housing 220 may be connected to the tub 110 through the connecting pipe 230.

The filter housing 220 may have a shape resulting from coupling two cylinders with each other. The upper cylinder may be connected to the heating duct 210, and the lower cylinder may be connected to the connecting pipe 230. A diameter of the upper cylinder may be different from that of the lower cylinder. A central axis of the upper cylinder may be not identical to that of the lower cylinder, although the central axis of the upper cylinder may be in parallel to that of the lower cylinder. However, the shape of the filter housing 220 is not limited to that shown in FIG. 3.

A filter 221 for filtering dust included in air sucked from the tub 110 may be provided inside the filter housing 220. For example, the filter 221 may be positioned at a portion where the upper cylinder is connected to the lower cylinder.

A washing water nozzle 222 for spraying water to wash the filter 221 may be provided inside the filter housing 220. The washing water nozzle 222 may be connected to the external water supply source through a washing water pipe 223, and a washing water valve 224 may be provided on the washing water pipe 223. The washing water valve 224 may supply water to the washing water nozzle 222 or block water from being supplied to the washing water nozzle 222, in response to an electrical signal. The washing water valve 224 may include, for example, a solenoid valve that is opened or closed in response to an electrical signal.

The connecting pipe 230 may be provided between the filter housing 220 and the tub 110, and guide air sucked from the tub 110 to the tub 110.

One end of the connecting pipe 230 may be connected to the condensing duct 240. More specifically, the connecting pipe 230 may be connected to the inlet port 112*c* of the tub 110. The other end of the connecting pipe 230 may also be connected to the filter housing 220.

The connecting pipe 230 may be in a shape of a bellows to prevent vibrations of the tub 110 from being transferred to the filter housing 220. However, the shape of the connecting pipe 230 is not limited to that shown in FIG. 3.

FIG. 4 is a control block diagram of a washing machine according to an embodiment of the disclosure.

The washing machine 100 may include a user inputter 171, a display 172, a current sensor 173, a first temperature sensor 174, a second temperature sensor 175, a motor driving circuit 180, the drum motor 130, the water supply valve 142, the drain pump 152, the fan motor 214, the tub heater 114, the duct heater 215, the washing water valve 224, a condensed water valve 246, and a controller 190. Also, the washing machine 100 may perform an operation of sensing an amount of laundry, a washing operation, a rinsing operation, and a drying operation.

The washing machine 100 may perform a washing operation while controlling the water supplier 140 and the drum motor 130, and perform a drying operation while controlling a hot air supplier 212 and the drum motor 130.

The washing machine 100 may supply hot air to the drum 20 through the hot air supplier 212 including the fan motor 214 and the duct heater 215. Hot air heated by the duct heater 215 may be supplied into the drum 20 by air current formed by the fan motor 214.

The drum motor 130, the water supply valve 142, the drain pump 152, the fan motor 214, the tub heater 114, the duct heater 215, the washing water valve 224, and the condensed water valve 246 have been described above with reference to FIG. 3.

The user inputter 171 may be provided on the control panel 103 of the cabinet 101, and include a dial 171a for obtaining a user input by a rotation, and an input button for obtaining a user input by a reciprocating movement.

A user may select any one from among a plurality of washing courses by rotating the dial 171a. The washing machine 100 may include a plurality of different washing courses for washing, for example, different kinds of laundry. The different washing courses may include different washing times, different rinsing times, and different dehydrating times.

The input button 171b may include a washing button for adjusting a washing time for which the washing machine 1 washes laundry, a rinsing button for adjusting the number of times of rinsing by which the washing machine 100 rinses laundry, and a dehydrating button for adjusting a dehydrating time for which the washing machine 100 dehydrates laundry. Also, the button 171b may include a power button for receiving power from an external power source or blocking power supplied from the external power source, and an operation button for starting or pausing an operation of the washing machine 100.

The dial 171a and the button 171b may transfer an electrical signal (voltage or current) corresponding to a user input received from a user to the controller 190, in response to the user input.

The display 172 may be provided on the control panel 103 of the cabinet 101, and display an operation state of the washing machine 100 or a user's control command. For example, the display 172 may display a washing course selected by a user, and display a time left until operation completion of the washing machine 100 while the washing machine 100 operates.

The display 172 may include a Light Emitting Diode (LED) panel, an Organic Light Emitting Diode (OLED) panel, or a Liquid Crystal Display (LCD) panel.

The display 172 may adopt a touch screen panel (TSP) for receiving a control command from a user and displaying operation information corresponding to the received control command.

As such, the display 172 may receive a display control signal from the controller 190, and display an image corresponding to the display control signal.

The current sensor 173 may sense motor current applied to the drum motor 130 for providing a rotation force to the drum 120. The drum motor 130 may consume more power according to an increase of a load caused by a weight of laundry at constant rpm, and consume less current according to a decrease of a load upon a reduction of water included in laundry.

The current sensor 173 may provide a measurement value of motor current to the controller 190 at regular time intervals. The current sensor 173 may include a current transformer (CT) for proportionally reducing a magnitude of current, and an ampere meter for detecting a magnitude of current proportionally reduced. That is, a current sensor 173 may detect current by proportionally reducing a magnitude of current by using the current transformer and then measuring a magnitude of the current proportionally reduced. The current sensor 173 may output a current signal corresponding to a magnitude of current applied to the drum motor 130, and provide the current signal to the controller 190.

The first temperature sensor 174 may be positioned at a location at which air enters the dryer 200.

The first temperature sensor 174 may measure temperature of low-temperature air, the temperature lowered from temperature of high-temperature air, entered the dryer 200. Also, the first temperature sensor 174 may measure temperature of water accommodated in the tub 110 or temperature of inside air of the tub 110 or the drum 120. For example, the first temperature sensor 174 may indirectly measure temperature of water accommodated in the tub 110 during a washing operation and/or a rinsing operation. Also, the first temperature sensor 174 may measure temperature of inside air of the tub 110 or the drum 120 during a drying operation. In other words, the first temperature sensor 174 may measure temperature of air discharged from the drum 120.

The first temperature sensor 174 may include a thermistor. An electrical resistance value of the thermistor may change according to temperature, and the first temperature sensor 174 may transfer an electrical signal (voltage or current) corresponding to an electrical resistance value of the thermistor to the controller 190.

The second temperature sensor 175 may be positioned at a location at which air is discharged from the dryer 200.

The second temperature sensor 175 may measure temperature of high-temperature air, the temperature raised from temperature of low-temperature air, passed through the dryer 200. For example, the second temperature sensor 175 may be installed around the duct heater 215. More specifically, the second temperature sensor 175 may be positioned downstream of the duct heater 215 on flow of air during a heating operation. Also, the second temperature sensor 175 may measure inside temperature of the heating duct 210. For example, the second temperature sensor 175 may measure temperature of air heated by the duct heater 215 during a drying operation. In other words, the second temperature sensor 175 may measure temperature of air that is supplied from the hot air supplier 212 to the drum 120.

The second temperature sensor 175 may include a thermistor. An electrical resistance value of the thermistor may change according to temperature, and the second temperature sensor 175 may transfer an electrical signal (voltage or current) corresponding to an electrical resistance value of the thermistor to the controller 190.

Meanwhile, the controller 190 may obtain information about a temperature difference based on temperature obtained through the first temperature sensor 174 and the second temperature sensor 175. The controller 190 may determine a degree of progress of a drying operation based on the temperature difference, and determine a time required for the drying operation. A more detailed description will be given below.

The motor driving circuit 180 may be mounted on a printed circuit board installed around the drum motor 130.

The motor driving circuit 180 may supply driving current to the drum motor 130. The motor driving circuit 180 may convert alternating current power of an external power source into driving power for driving the drum motor 130.

The motor driving circuit 180 may have various topologies according to a kind of the drum motor 130.

For example, in a case which the drum motor 130 is a direct current motor, the motor driving circuit 180 may convert alternating current power supplied from an external power source into direct current power, and intermittently supply the direct current power to the drum motor 130. In a case in which the drum motor 130 is a brushless direct current motor, the motor driving circuit 180 may convert alternating current power into direct current power, then convert the direct current power into alternating current power being in a form of a square wave, and supply the alternating current power being in the form of the square wave to the drum motor 130. In a case in which the drum motor 130 is a permanent magnet synchronous motor, the motor driving circuit 180 may convert alternating current power into direct current power, then convert the direct current power into alternating current power being in a form of a sine wave and supply the alternating current power being in the form of the sine wave to the drum motor 130. In a case in which the drum motor 130 is an induction motor, the motor driving circuit 180 may intermittently supply alternating current power supplied from an external power source to the drum motor 130.

The controller 190 may be mounted, for example, on a printed circuit board provided on a rear surface of the control panel 103.

The controller 190 may be electrically connected to the user inputter 171, the current sensor 173, the first temperature sensor 174, the second temperature sensor 175, the display 172, the motor driving circuit 180, the water supply valve 142, the drain pump 152, the fan motor 214, the tub heater 114, the duct heater 215, the washing water valve 224, and the condensed water valve 246.

The controller 190 may control the display 172, the motor driving circuit 180, the fan motor 214, and the duct heater 215 based on an output from the current sensor 173.

The controller 190 may control the display 172, the motor driving circuit 180, the fan motor 214, and the duct heater 215 based on outputs from the first temperature sensor 174 and the second temperature sensor 175.

The controller 190 may control the display 172, the motor driving circuit 180, the fan motor 214, and the duct heater 215 based on outputs from the current sensor 173, the first temperature sensor 174, and the second temperature sensor 175.

The controller 190 may include a processor 191 for generating a control signal for controlling an operation of the washing machine 100, and a memory 192 memorizing or storing a program and data for generating a control signal for controlling an operation of the washing machine 100. The processor 191 and the memory 192 may be implemented as separate chips or a single chip. Also, the controller 190 may include a plurality of processors or a plurality of memories.

The processor 191 may process data and/or a signal according to a program provided from the memory 192, and provide a control signal to individual configurations of the washing machine 100 based on a result of the processing.

The processor 191 may receive an electrical signal about a user input from the user inputter 171, receive an electrical signal about current from the current sensor 173, receive an electrical signal about temperature of air entered the dryer 200 from the first temperature sensor 174, and receive an electrical signal about temperature of air discharged from the dryer 200 from the second temperature sensor 175. The processor 191 may process the electrical signal about the user input, the electrical signal about the current, and the electrical signal about the temperature.

The processor 191 may identify a washing course selected by a user based on a user input. The processor 191 may determine rpm and an operation cycle (for example, an on time and an off time) of the drum 120 depending on the washing course selected by the user, and provide a motor signal for rotating the drum motor 130 to the motor driving circuit 180 according to the determined rpm and operation cycle.

During a drying operation, the processor 191 may provide a blow signal for sucking inside air of the tub 110 or the drum 120 to the dryer 200 to the fan motor 214, provide a duct heating signal for heating air of the heating duct 210 to the duct heater 215, provide a condensation signal for spraying water to the condensing duct 240 to the condensed water valve 246, and provide a driving signal for rotating the drum 120 to the motor driving circuit 180.

The processor 191 may include an operation circuit, a memory circuit, and a control circuit. The processor 191 may include a single chip or a plurality of chips. Also, the processor 191 may include a single core or a plurality of cores.

The memory 192 may memorize or store a program and data for controlling an operation of the washing machine 100 according to a washing course. For example, the memory 192 may memorize or store rpm of the drum 120 according to a washing course, and a washing time/number of times of rinsing/dehydration time according to a washing course.

The memory 192 may memorize a user input received through the dial 171a and the input button 171b, or information (for example, information about an operation being currently performed or a time left until operation completion of the washing machine 100) about an operation of the washing machine 100.

The memory 192 may include a volatile memory, such as a Static Random Access Memory (S-RAM) and a Dynamic Random Access Memory (D-RAM), and a non-volatile memory, such as a Read Only Memory (ROM) and an Erasable Programmable Read Only Memory (EPROM).

The memory 192 may include a single memory device or a plurality of memory devices.

The controller 190 may control individual configurations of the washing machine 100 to wash/rinse/dehydrate/dry laundry. The controller 190 may perform a washing operation, a rinsing operation, a dehydrating operation, and a drying operation.

According to an increase in amount of laundry, current that is supplied from the motor driving circuit 180 to the drum motor 130 may increase. The controller 190 may control the motor driving circuit 180 to rotate the drum 120 forward or backward, and measure current supplied from the motor driving circuit 180 to the drum motor 130 to measure an amount of laundry. Accordingly, the controller 190 may estimate the amount of laundry based on the current supplied from the motor driving circuit 180 to the drum motor 130. Also, the controller 190 may estimate a dehydrated state or a dried state of laundry based on current supplied from the motor driving circuit 180 to the drum motor 130.

The controller 190 may supply water and a detergent to the tub 110. The controller 190 may open the water supply valve 142 to supply water to the tub 110 depending on the measured amount of laundry. By opening the water supply valve 151, water may be supplied to the tub 110 via the detergent case 161. Accordingly, a detergent may be supplied to the tub 110 together with water during a first water supply for washing.

The controller 190 may rotate the drum 120 at low rpm for washing. The controller 190 may control the motor driving circuit 180 to rotate the drum 120 at low rpm (for example, rpm between about 45 rpm and about 60 rpm). The controller 190 may control the motor driving circuit 180 to rotate the drum 120 alternately in a first direction and a second direction. While the drum 120 rotates alternately in the first direction and the second direction, laundry accommodated inside the drum 120 may roll along an inner wall of the drum 120 or be lifted and then fall. Foreign materials attached to the laundry may be separated from the laundry by physical actions caused by rolling and falling of the laundry and chemical actions of the detergent.

The controller 190 may discharge water stored in the tub 110. The controller 190 may operate the drain pump 152 to discharge the water stored in the tub 110. The water stored in the tub 110 may be pumped to the outside by the drain pump 152.

The controller 190 may rotate the drum 120 at high rpm for midway dehydrating. The controller 190 may control the motor driving circuit 180 to rotate the drum 120 at high rpm (for example, rpm between about 1000 rpm and about 1100 rpm). While the drum 120 rotates at high rpm, the laundry accommodated inside the drum 120 may be located along the inner wall of the drum 120, and water absorbed in the laundry may be separated from the laundry by a centrifugal force. The water separated from the laundry may pass through the through hole 121a of the drum 120 and then be discharged to the outside via the tub 110 and the drain pipe 151.

Thereafter, the controller 190 may perform a rinsing operation. The controller 190 may supply water to the tub 110, and rotate the drum 120 at low rpm for rinsing. The controller 190 may discharge water stored in the tub 110 and rotate the drum 120 at high rpm for midway dehydrating.

Then, the controller 190 may perform a dehydrating operation. The controller 190 may rotate the drum 120 at high rpm.

Thereafter, the controller 190 may perform a drying operation.

The controller 190 may operate the duct heater 215 to heat inside air of the tub 110 or the drum 120. In response to preset temperature of the inside air of the tub 110, the controller 190 may operate the duct heater 215, while controlling the motor driving circuit 180 to rotate the drum 120 at constant rpm (for example, rpm between about 45 rpm and about 60 rpm). The controller 190 may open the condensed water valve 246 to supply water to the condensing duct 240.

Meanwhile, the disclosure relates to estimating a dried state of laundry during a drying operation based on current applied to the drum motor 130 and/or temperature of air circulating through the dryer 200 without any direct contact to the laundry. Hereinafter, a process of determining a dried state of laundry and determining a completion time of a drying operation will be described in detail with reference to flowcharts shown in FIGS. 5, 8, 10, 11, and 12.

FIG. 5 is a flowchart illustrating a method for controlling a washing machine according to an embodiment of the disclosure, FIG. 6 is a graph showing a reduction of motor current over drying time of laundry, and FIG. 7 shows data obtained by applying filtering to the graph of FIG. 6. The embodiment of FIG. 5 will be described in detail with reference to FIGS. 6 and 7.

The controller 190 may control the drum motor 130 to rotate the drum 120, in operation 501. The washing machine 100 may rotate the drum 120 at constant rpm to apply hot air generated by the dryer 200 to the entire of laundry during a drying operation.

The current sensor 173 may sense motor current in operation 502, and output a current signal. The controller 190 may obtain a measurement value of motor current for determining a dryness of an object to be dried, accommodated in the drum 120, based on a current signal, at regular time intervals, in operation 503. The current sensor 173 may output a current signal corresponding to a magnitude of current applied to the drum motor 130, and transfer the current signal to the controller 190. For example, the controller 190 may control the drum 120 to rotate at constant rpm, and obtain a measurement value of motor current applied to the drum motor 130 at time intervals of one minute. The measurement value may be a magnitude of current applied to the drum motor 130. The smaller magnitude of current may represent the smaller measurement value, and the smaller measurement value may represent a smaller weight of an object to be dried according to the progress of drying.

Also, the controller 190 may calculate an average measurement value by calculating an average of a plurality of measurement values for a preset time period, in operation 503. Because a measure value may include noise due to a rotation of the drum 120 and an external factor, an average measurement value obtained by calculating an average in a unit of a preset time period may be used to raise reliability.

Referring to FIG. 6, a magnitude of motor current may be reduced over time during a drying operation, and, after the drying operation proceeds up to a certain degree, the magnitude of motor current may be no longer reduced or converge to a certain range. The reason may be because water of laundry is removed by the drying operation and accordingly, a weight of the laundry is reduced. The disclosure may determine a dried state of laundry based on the tendency. As shown in the drawings, a magnitude of motor current and a change in magnitude of motor current may depend on an initial weight of laundry.

Optionally, the controller 190 may perform filtering on the measurement value and/or the average measurement value, in operation 504. The measurement value and/or average measurement value of the motor current may deviate from a range of normal values according to falling or an arrangement of fabric inside the drum 120. Accordingly, the controller 190 may perform filtering on the measurement value and/or average measurement value of the motor current obtained at the regular time intervals. At this time, the filtering may remove noise by installing a separate hardware filter circuit or by performing a separate software method. The filter may include a low pass filter, a moving average filter, etc.

The controller 190 may sequentially obtain average measurement values, compare the average measurement values with each other, and generate an event based on a result of the comparison, in operation 506. For example, the controller 190 may compare a first average measurement value with a second average measurement value obtained in succession to the first average measurement value and generate an event according to a determination that the second average measurement value is greater than or equal to the first average measurement value, in operations 505 and 506. The event may be an index for determining a dried state, and may be sequentially accumulated upon satisfaction of a preset condition.

A reduction of an average measurement value over time may represent a reduction in weight of an object to be dried according to the progress of drying. In a case in which water contained in an object to be dried has been nearly completely removed, an average measurement value may converge to a certain value. That is, according to completion of drying, an average measurement value and/or a measurement value may tend to be no longer reduced, and completion of drying may be estimated based on the tendency.

Therefore, the controller 190 may generate an event according to a determination that the second average measurement value is greater than or equal to the second average measurement value. That the second average measurement value is equal to the first average measurement value may indicate that a significant degree of drying has proceeded and accordingly, a weight of an object to be dried is no longer reduced.

Also, the controller 190 may generate an event according to a determination that the second average measurement value is greater than the first average measurement value. A case in which the first average measurement value is greater than the second average measurement value may indicate that a weight of an object to be dried is reduced, which is determined that drying is not yet completed but proceeding. The remaining cases except for the case may be determined to be cases in which drying has been completed. In the current embodiment of the disclosure, a case in which the second average measurement value is greater than the first average measurement value may be also included in event generation conditions by considering that noise may be generated by a rotation of the drum 120 and an external factor.

Meanwhile, after an event is generated, the controller 190 may further perform a comparison with an average measurement value (or a measurement value) sequentially calculated, in operation 507, and generate an event based on a result of the comparison, in operation 509. For example, the controller 190 may compare the second average measurement value with a third average measurement value calculated after the second average measurement value is calculated, and generate an event according to a determination that the third average measurement value is greater than or equal to the second average measurement value, in operations 507 and 509. Upon satisfaction of the above-described conditions, two events may be accumulated in operations 506 and 509. Operations 505 to 510 may be repeatedly performed. The above description relates to an event generation condition based on average measurement values, however, the operations 505 to 510 may also be applied to measurement values, not average measurement values.

According to an embodiment of the disclosure, the controller 190 may obtain a measurement value and/or an average measurement value of motor current periodically, and whenever the controller 190 obtains a measurement value and/or an average measurement value of motor current, the controller 190 may generate an event according to a determination that the measurement value and/or the average measurement value of the motor current is greater than or equal to a preset magnitude. A plurality of events may be sequentially generated in a case in which a load of the washing machine 100 converges to a certain range. Accordingly, based on a determination that the number of events sequentially generated is more than or equal to a preset number, the controller 190 may finish the drying operation.

The controller 190 may compare sequentially obtained average measurement values with each other, and according to a determination that the average measurement value generated later is smaller than the average measurement value generated earlier, the controller 190 may erase at least one event already generated, thereby performing initialization, in operation 509. For example, in a case in which the second average measurement value is smaller than the first average measurement value, it may be determined that a load of the object to be dried is reduced, which represents a continuous reduction of water. That is, the case may correspond to a state in which drying has been not yet completed, which requires an additional drying time.

Meanwhile, the controller 190 may repeatedly perform operations 505 to 510, thereby accumulating a plurality of events. The accumulated events may have been sequentially generated.

The controller 190 may finish the drying operation based on the number of the generated events, in operation 511. That is, the controller 190 may control the hot air supplier 212 based on the number of events. The controller 190 may compare the number of events with the preset number, in operation 510, and according to a determination that the number of events sequentially generated is more than or equal to the preset number, the controller 190 may finish the drying operation, in operation 511, wherein the preset number may be 5, however, the preset number may be set to various values depending on a weight of laundry and/or a kind of laundry. For example, the preset number may be set to 7 that is greater than 5, with respect to heavy laundry from which a large amount of water needs to be removed. Also, the preset number may be set to 7 that is greater than 5, with respect to laundry made of cotton fiber not synthetic fiber, because speed at which water is removed from the cotton fiber is slower than speed at which water is removed from the synthetic fiber. In contrast, the preset number may be set to 3 that is smaller than 5, with respect to laundry made of a relatively light material or synthetic fiber.

Meanwhile, as described above, the disclosure may determine a dried state based on the number of events based on motor current. To raise reliability on the determination, the disclosure may determine a dried state by further considering a temperature difference of the dryer 200, in addition to events. The operation will be described in detail with reference to FIGS. 8 and 9.

FIG. 8 is a flowchart illustrating a method for controlling a washing machine including a dryer according to an embodiment of the disclosure, and FIG. 9 shows differences between inlet temperature and outlet temperature of the dryer according to an embodiment of the disclosure shown in FIG. 8.

A determination on whether a condition according to the current embodiment of the disclosure is satisfied may be conducted independently from a determination on whether the condition described above with reference to FIG. 5 is satisfied. However, both a determination on whether the condition according to the current embodiment of the disclosure is satisfied and a determination on whether the condition described above with reference to FIG. 5 is satisfied may be conducted. In this case, in a case in which both the conditions are satisfied, it may be determined that a drying operation has been completed.

The controller 190 may operate the dryer 200, in operation 801. During a drying operation, the washing machine 100 may operate the dryer 200 to apply hot air to laundry accommodated in the drum 120 to thereby evaporate water contained in the laundry.

The dryer 200 according to an embodiment of the disclosure may include the first temperature sensor 174 and the second temperature sensor 175. The controller 190 may obtain first temperature from the first temperature sensor 174, in operation 802, and obtain second temperature from the second temperature sensor 175, in operation 803. The first temperature sensor 174 may be positioned at a location at which air enters the dryer 200, and the second temperature sensor 175 may be positioned at a location at which air is discharged from the dryer 200.

Air entering the dryer 200 among air circulating through the drum 120 and the dryer 200 may be at relatively low temperature because the air has lost heat by water contained in laundry accommodated in the drum 120, and air discharged from the dryer 200 may be at relatively high temperature because the air has been heated by the duct heater 215 (see FIG. 4). A difference between temperature measured by the second temperature sensor 175 and temperature measured by the first temperature 174 may be reduced according to the progress of the drying operation.

According to an embodiment of the disclosure, upon generation of an event, the controller 190 may control the hot air supplier 212 based on a difference between the first temperature measured by the first temperature sensor 174 and the second temperature measured by the second temperature sensor 175. Generation of an event may represent that drying has been substantially performed, and satisfaction of the condition related to a temperature difference, as an additional condition, may be considered as completion of drying. In this case, the controller 190 may finish the drying operation by controlling the hot air supplier 212.

It is seen from FIG. 9 that a difference between temperature of entering air and temperature of discharging air is reduced according to the progress of a drying operation. Also, the temperature difference may be reduced more rapidly with respect to a lighter weight of laundry. However, the temperature difference may have a constant difference value upon completion of a drying operation, regardless of a weight. For example, upon completion of drying, the temperature difference may be about 10° C.

According to a determination that the difference between the first temperature measured by the first temperature sensor 174 and the second temperature measured by the second temperature sensor 175 is smaller than or equal to a preset temperature difference, in operation 804, the controller 190 may finish the drying operation, in operation 805.

According to an embodiment of the disclosure, the controller 190 may finish the drying operation according to a determination that the difference between the first temperature measured by the first temperature sensor 174 and the second temperature measured by the second temperature sensor 175 is smaller than or equal to the preset temperature difference, regardless of other conditions.

Also, in an embodiment of the disclosure, according to a determination that the number of sequentially accumulated events is more than or equal to a preset number (see FIG. 5) and a difference between temperature measured by the first temperature sensor 174 and temperature measured by the second temperature sensor 175 is smaller than or equal to the preset temperature difference, the controller 190 may finish the drying operation. Also, according to an embodiment of the disclosure, the controller 190 may control the hot air supplier 212 based on a result obtained by comparing the difference between the first temperature and the second temperature with a preset reference value.

Meanwhile, an additional condition for finishing a drying operation has been described with reference to FIGS. 8 and 9. The above-mentioned temperature difference may be a condition for finishing a dying operation, however, another difference value may be used to change a condition for finishing a drying operation or as criterion for a time at which a dried state is determined. The operation will be described in detail with reference to FIGS. 10 and 11.

FIG. 10 is a flowchart illustrating a method for controlling a washing machine according to an embodiment of the disclosure to reduce a number of events.

The controller 190 may operate the dryer 200, in operation 1001. During a drying operation, the washing machine 100 may operate the dryer 200 to apply hot air to laundry accommodated inside the drum 120 to thereby evaporate water contained in the laundry.

The controller 190 may obtain first temperature from the first temperature sensor 174, in operation 1002, and obtain second temperature from the second temperature sensor 175, in operation 1003.

Then, the controller 190 may finish the drying operation according to a determination that a difference between the first temperature measured by the first temperature sensor 174 and the second temperature measured by the second temperature sensor 175 is smaller than or equal to a first temperature difference, in operation 1005. The first temperature difference may be the preset temperature difference applied to the embodiment of FIG. 8, and may be about 10° C. which is criterion for finishing a drying operation.

Meanwhile, the controller 190 may determine that the drying operation needs to continue to be performed, according to a determination that a difference between the first temperature measured by the first temperature sensor 174 and the second temperature measured by the second temperature sensor 175 is greater than the first temperature difference. Then, the controller 190 may determine whether the difference is smaller than or equal to a second temperature difference, in operation 1006. The second temperature difference may be close to the first temperature difference although the second temperature difference is greater than the first temperature difference, and the second temperature difference may represent an approach to completion of a drying operation.

According to a determination that the difference between the first temperature measured by the first temperature sensor 174 and the second temperature measured by the second temperature sensor 175 is smaller than or equal to the first temperature difference, the controller 190 may reduce a preset number of events, in operation 1007. The current embodiment of the disclosure may be considered together with the embodiment of FIG. 5, and may be applied to operation 510 of FIG. 5. According to a determination that a difference between temperature measured by the first temperature sensor 174 and temperature measured by the second temperature sensor 175 is smaller than or equal to a certain difference, an approach to completion of a drying operation may be determined, and by reducing the number of events, a condition for drying completion may be loosened.

So far, an embodiment for changing a condition for finishing a drying operation has been described with reference to FIG. 10. Hereinafter, an embodiment for determining a time at which a dried state is determined will be described in detail with reference to FIG. 11.

FIG. 11 is a flowchart illustrating a method for controlling a washing machine according to an embodiment of the disclosure to determine an event generation time.

Meanwhile, in the embodiment of the disclosure described above with reference to FIG. 5, obtaining a measurement value of motor current or generating an event may be performed until a drying operation is finished after the drying operation starts. However, obtaining a measurement value of motor current or generating an event throughout a drying operation may cause unnecessary power consumption by the current sensor 173.

The controller 190 may operate the dryer 200, in operation 1101. During a drying operation, the washing machine 100 may operate the dryer 200 to apply hot air to laundry accommodated inside the drum 120 to thereby evaporate water contained in the laundry.

The controller 190 may obtain first temperature from the first temperature sensor 174, in operation 1102, and obtain second temperature from the second temperature sensor 175, in operation 1103.

According to a determination that a difference between the first temperature measured by the first temperature sensor 174 and the second temperature measured by the second temperature sensor 175 is smaller than or equal to a third temperature difference, in operation 1104, the controller 190 may obtain a measurement value and/or an average measurement value of motor current, at regular time intervals, or generate an event, in operation 1105. That is, a condition for performing operation 503 or 506 in the method illustrated in FIG. 5 may be applied. The third temperature difference may be close to the second temperature difference of FIG. 10 although the third temperature difference is greater than the second temperature difference, and the third temperature difference may represent a certain degree of progress toward completion of a drying operation even though the third temperature difference does not represent an approach to completion of a drying operation.

FIG. 12 is a flowchart illustrating a method for controlling a washing machine according to an embodiment of the disclosure to determine a completion time of a dry operation based on an initial load.

The current embodiment of the disclosure may consider an initial load of laundry upon putting the laundry, in addition to the conditions related to an event and a temperature difference of the dryer 200, among the above-described conditions for finishing a drying operation. A difference between a weight of laundry containing no water before washing and a weight of the laundry containing little water after a drying operation may be small. Under an assumption that the drum 120 accommodating laundry rotates at the same rpm both before a washing operation and after a drying operation, the same or similar magnitude of motor current may be applied to the drum motor 130 due to the same load of the laundry. Based on the property, the condition related to an event, and the condition related to a temperature difference, a dried state may be more accurately determined.

The controller 190 may rotate the drum 120 at preset rpm before starting a washing operation, in operation 1201. For example, the controller 190 may control, before water is supplied to laundry, that is, before a washing operation starts, the motor driving circuit 180 to rotate the drum 120 at low rpm (for example, rpm between about 45 rpm to about 60 rpm).

The controller 190 may obtain a first magnitude value of motor current, in operation 1202. Through the process, the controller 190 may estimate a weight of laundry. As a result, the controller 190 may obtain a magnitude value of motor current that is applied for constant rpm before water is supplied to laundry.

The controller 190 may rotate the drum 120 at preset rpm during a drying operation, in operation 1203. The preset rpm may be the same rpm as in operation 1201. The controller 190 may consider a magnitude of motor current applied under a condition of the same rpm, to compare a weight of the laundry immediately after the laundry is put with a weight of the laundry after the laundry is dried.

The controller 190 may obtain a second magnitude value of motor current, in operation 1204. Through the process, the controller 190 may estimate a weight of the laundry during the drying operation, or determine a degree of progress of the drying operation.

According to the current embodiment of the disclosure, additionally, individual operation times of the washing machine 1 may be determined based on a current signal depending on motor current. According to an embodiment of the disclosure, the controller 190 may determine an execution time of a washing operation based on a current signal. That is, the controller 190 may determine a time of a washing operation by considering a weight of laundry. Also, according to an embodiment of the disclosure, the controller 190 may determine an amount of water to be supplied to the tub 110, based on a current signal, and control the water supplier 140 according to the amount of water.

The controller 190 may determine whether a difference between the first magnitude value and the second magnitude value is smaller than or equal to a preset current difference, in operation 1205. According to a determination that the difference between the first magnitude value and the second magnitude is smaller than or equal to the preset current difference, the controller 190 may immediately finish the drying operation.

However, to secure reliability of a determination on a dried state, the controller 190 may further determine whether the following additional condition is satisfied.

The controller 190 may finish the drying operation according to a determination that the number of sequentially generated events is more than or equal to a preset number, in operation 1208.

In an embodiment of the disclosure, according to a determination that the difference between the first magnitude value and the second magnitude value is smaller than or equal to the preset current difference and the number of sequentially generated events is more than or equal to the preset number, the controller 190 may finish the drying operation.

In contrast, according to a determination that the difference between the first magnitude value and the second magnitude value is greater than the preset current difference, the controller 190 may maintain the drying operation, in operation 1209.

Also, the controller 190 may finish the drying operation according to a determination that a difference between temperature measured by the first temperature sensor 174 and temperature measured by the second temperature sensor 175 is smaller than or equal to a first temperature difference.

In an embodiment of the disclosure, according to a determination that the difference between the first magnitude value and the second magnitude value is smaller than or equal to the preset current difference and the difference between the temperature measured by the first temperature sensor 174 and the temperature measured by the second temperature sensor 175 is smaller than or equal to the first temperature difference, the controller 190 may finish the drying operation.

In contrast, the controller 190 may maintain the drying operation according to a determination that the difference between the temperature measured by the first temperature sensor 174 and the temperature measured by the second temperature sensor 175 is greater than the first temperature difference, in operation 1209.

FIG. 13 is a flowchart illustrating a cooling operation of a washing machine according to an embodiment of the disclosure.

The washing machine 100 according to an embodiment of the disclosure may perform a cooling operation for a preset time period from a time at which a drying operation is finished or after a drying operation is finished. The cooling operation may be an operation for removing heat remaining in laundry by turning off the heater and operating the fan 213. The cooling operation may prevent a user from being exposed to hot air excessively discharged from the door 102 opened after a drying operation is finished.

To perform the cooling operation, the controller 190 may turn off the heater, in operation 1301, and operate the fan 213, in operation 1302. At this time, the fan 213 may be repeatedly turned on/off in a turned-off state of the heater. For example, the fan 213 may be set to be turned on for 20 seconds and then turned off for 10 seconds.

After the fan 213 operates for a preset time period, the cooling operation may terminate, in operation 1303.

According to an aspect of the disclosure, by using the non-contact sensors already included in the washing machine, a dried state may be accurately determined.

Meanwhile, the disclosed embodiments may be implemented in the form of recording medium storing instructions that are executable by a computer. The instructions may be stored in the form of program code, and when executed by a processor, the instructions may generate a program module to perform operations of the disclosed embodiments. The recording medium may be implemented as computer-readable recording medium.

The computer-readable recording medium may include all kinds of recording media storing instructions that can be interpreted by a computer. For example, the computer-readable recording medium may be Read Only Memory (ROM), Random Access Memory (RAM), a magnetic tape, a magnetic disc, flash memory, an optical data storage device, etc.

The machine-readable storage medium may be provided in the form of a non-transitory storage medium, wherein the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium. For example, a 'non-transitory storage medium' may include a buffer in which data is temporarily stored.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloadable or uploadable) online via an application store (e.g., Play Store™) or between two user devices (e.g., smart phones) directly. When distributed online, at least part of the computer program product (e.g., a downloadable app) may be temporarily generated or at least temporarily stored in the machine-readable storage medium, such as a memory of the manufacturer's server, a server of the application store, or a relay server.

So far, the disclosed embodiments have been described with reference to the accompanying drawings. It will be apparent that those skilled in the art can make various modifications thereto without changing the technical spirit and essential features of the present disclosure. Thus, it should be understood that the embodiments described above are merely for illustrative purposes and not for limitation purposes in all aspects.

What is claimed is:

1. A washing machine with a drying function comprising:
a drum to receive an object, the drum being rotatable;
a tub to accommodate the drum and to receive water;
a drum motor configured to provide a rotation force to the drum, for the drum to rotate within the tub;
a water supplier configured to supply the water to the tub;
a hot air supplier configured to supply hot air to the drum;
a current sensor configured to output a current signal based on a magnitude of current applied to the drum motor to rotate the drum; and
a controller configured to perform
a washing operation while controlling the water supplier and the drum motor, and
a drying operation while controlling the hot air supplier and the drum motor,
wherein the controller is configured to
determine a dryness of the object, accommodated in the drum, based on the current signal received while performing the drying operation,
obtain an average measurement value corresponding to the dryness of the object by calculating an average of a plurality of measurement values measured during a preset time period,
compare a first average measurement value with a second average measurement value obtained in succession to the first average measurement value,
determine an event is generated based on a determination that the second average measurement value is greater than or equal to the first average measurement value, and
control the hot air supplier based on the number of times by which the event is generated.

2. The washing machine of claim 1, wherein the controller is further configured to
compare the second average measurement value with a third average measurement value obtained in succession to the second average measurement value,
determine the event is generated based on a determination that the third average measurement value is greater than or equal to the second average measurement value, and
control the hot air supplier based on a determination of sequentially generated events.

3. The washing machine of claim 2, wherein the controller is further configured to control the hot air supplier based on a determination of a preset number of sequentially generated events, and erase a number of previously generated events according to a determination that the third average measurement value is smaller than the second average measurement value.

4. The washing machine of claim 1, further comprising a first temperature sensor configured to measure temperature of air discharged from the drum and a second temperature sensor configured to measure temperature of air supplied from the hot air supplier to the drum, wherein the controller is further configured to control the hot air supplier based on a difference between first temperature measured by the first temperature sensor and second temperature measured by the second temperature sensor, upon generation of the event.

5. The washing machine of claim 4, wherein the controller is further configured to compare the difference between the first temperature and the second temperature with a preset reference value.

6. The washing machine of claim 1, wherein the controller is further configured to determine an execution time of the washing operation based on the current signal.

7. The washing machine of claim 1, wherein the controller is further configured to determine an amount of water to be supplied to the tub based on the current signal, and control the water supplier according to the amount of water.

8. The washing machine of claim 1, wherein the controller is further configured to rotate the drum at preset revolutions per minute (rpm) before starting the washing operation to obtain a first magnitude value of motor current applied to the drum motor at the preset rpm, rotate the drum at the preset rpm during the drying operation to obtain a second magnitude value of motor current applied to the drum motor at the preset rpm, and finish the drying operation according to a determination that a difference between the first magnitude value and the second magnitude value is smaller than or equal to a preset current difference and a number of sequentially generated events reaches a preset number.

9. The washing machine of claim 4, wherein the controller is further configured to rotate the drum at preset revolutions per minute (rpm) before starting the washing operation to obtain a first magnitude value of motor current applied to the drum motor at the preset rpm, rotate the drum at the preset rpm during the drying operation to obtain a second magnitude value of motor current applied to the drum motor at the preset rpm, and finish the drying operation according to a determination that a difference between the first magnitude value and the second magnitude value is smaller than or equal to a preset current difference and a difference between temperature measured by the first temperature sensor and temperature measured by the second temperature sensor is smaller than or equal to a first temperature difference.

10. The washing machine of claim 3, wherein the controller is further configured to turn off a heater and turn on a fan to perform a cooling operation after finishing the drying operation.

11. A method for controlling a washing machine with a drying function, the washing machine including a drum to receive an object, the drum being rotatable, a tub to accommodate the drum and to receive water, a drum motor configured to provide a rotation force to the drum, for the drum to rotate within the tub, a water supplier configured to supply the water to the tub, a hot air supplier configured to supply hot air to the drum, and a current sensor configured to output a current signal based on a magnitude of current applied to the drum motor to rotate the drum, the method comprising:

performing a washing operation while controlling the water supplier and the drum motor;

performing a drying operation while controlling the hot air supplier and the drum motor;

determining a dryness of the object, accommodated in the drum, based on the current signal received while performing the drying operation;

obtaining an average measurement value corresponding to the dryness of the object by calculating an average of a plurality of measurement values measured during a preset time period;

comparing a first average measurement value with a second average measurement value obtained in succession to the first average measurement value;

determining an event is generated based on a determination that the second average measurement value is greater than or equal to the first average measurement value; and controlling the hot air supplier based on the number of times by which the event is generated.

12. The method of claim 11, wherein the comparing the first average measurement value with the second average measurement value further comprises comparing the second average measurement value with a third average measurement value obtained in succession to the second average measurement value, the determining that the event is generated further comprises determining the event is generated based on a determination that the third average measurement value is greater than or equal to the second average measurement value, and the controlling of the hot air supplier further comprises controlling the hot air supplier based on a determination of sequentially generated events.

13. The method of claim 12, wherein the controlling of the hot air supplier further comprises controlling the hot air supplier based on a determination of a preset number of sequentially generated events, and erasing a number of previously generated events according to a determination that the third average measurement value is smaller than the second average measurement value.

14. The method of claim 11, wherein the washing machine further includes a first temperature sensor configured to measure temperature of air discharged from the drum and a second temperature sensor configured to measure temperature of air supplied from the hot air supplier to the drum, and the controlling of the hot air supplier further comprises controlling the hot air supplier based on a difference between first temperature measured by the first temperature sensor and second temperature measured by the second temperature sensor, upon generation of the event.

15. The method of claim 14, wherein the controlling of the hot air supplier further comprises comparing the difference between the first temperature and the second temperature with a preset reference value.

* * * * *